United States Patent [19]
Wilks et al.

[11] 3,926,570
[45] Dec. 16, 1975

[54] ELECTRICALLY CONDUCTIVE COMPOSITIONS OF MATTER

[75] Inventors: Alan D. Wilks, Mount Prospect; Karl J. Youtsey, Chicago, both of Ill.

[73] Assignee: Universal Oil Products Company, Des Plaines, Ill.

[22] Filed: Mar. 4, 1974

[21] Appl. No.: 448,113

[52] U.S. Cl. .................................................. 29/195
[51] Int. Cl.² ........................................ B32B 15/04
[58] Field of Search ......... 29/195 M, 195 G, 195 Y, 29/195 W; 117/100 S, 100 B, 100 A

[56] References Cited
UNITED STATES PATENTS

| | | | |
|---|---|---|---|
| 3,218,194 | 11/1965 | Maissel | 117/217 |
| 3,222,207 | 12/1965 | Marshall | 117/47 |
| 3,222,218 | 12/1965 | Beltzer et al. | 117/213 |
| 3,252,722 | 5/1966 | Allen | 29/195 X |
| 3,390,969 | 7/1968 | Sullivan et al. | 29/195 |
| 3,476,594 | 11/1969 | Söderberg | 117/211 |
| 3,622,367 | 11/1971 | Haag et al. | 117/37 R |
| 3,730,756 | 5/1973 | Kunda et al. | 117/47 R |

*Primary Examiner*—L. Dewayne Rutledge
*Assistant Examiner*—E. L. Weise
*Attorney, Agent, or Firm*—James R. Hoatson, Jr.; Raymond H. Nelson; William H. Page, II

[57] ABSTRACT

Electrically conductive compositions of matter which possess desirable electrical and physical properties are prepared by coating an electrically insulating substrate with a base metal such as copper to a desired thickness and thereafter exchanging the surface layer of the base metal for a layer of noble metal such as gold. The thus produced composition of matter will possess conductivities within the desired range as well as being resistant to oxidation.

8 Claims, No Drawings

ELECTRICALLY CONDUCTIVE COMPOSITIONS OF MATTER

This invention relates to novel compositions of matter. More specifically the invention relates to novel compositions of matter possessing desirable electrical and physical characteristics, said compositions of matter comprising an electrically insulating substrate having a base metal deposited thereon, the surface of said base metal being coated with a noble metal.

Metallized conductive pigments are finding increased usage in the electrical field. For example, these pigments may be used as fillers in polymeric materials to impart electrical resistance properties thereto. For example, a polymeric material containing pigments of the type hereinafter set forth in greater detail may be used where controllable resistance changes with temperature are required, as articles or products which possess low current noise, in applications which require quiet contacts to be attached to the final product and in other instances where a resistance stability with respect to temperature cycling is required. By utilizing these metallized conductive pigments, it is possible to prepare articles of manufacture which may possess conducting or anti-static properties. For example, it can be seen that an anti-static formulation would be extremely suitable in instances in which it is desirable to eliminate electric charges which may be built up by friction such as in synthetic fabrics which become charged by rubbing against another material as in automobile, bus or truck upholstery. In addition, it may also be most desirable to use the polymeric materials containing these metallized conductive pigments in explosive environments such as fuel containers in airplanes, boats, automobiles, trucks, buses, etc., in fuel transfer pipelines such as those which are used to transport gasoline, oil, liquefied petroleum gas, heating gas, etc. or in medical operating room surfaces where oxygen and/or flammable vapors may be present with the concomitant possibility of sparking taking place.

Likewise it is also possible to utilize these metallized conductive pigments in electrical resistor inks, said electrical resistor inks finding a wide variety of uses in the electrical field. For example, one application of electrical resistor inks is to produce direct substitutes for discrete resistors in all types of electrical circuits, a particularly advantageous use being in connection with laminated printed circuit boards. The electrical resistor ink can be applied to either side of the circuit board, that is, the component side or the foil side, prior to the final soldering step in which discrete components are electrically attached. In addition, either single-or multi-layered circuit boards are suitable. For example, in the latter case where multiple layers of circuits are involved direct incorporation of the printed resistors in the layers provides an obvious benefit in lowering component densities where discrete components must be attached, thus resulting in a significant saving of space. In addition to the use hereinbefore described in laminated printed circuit boards, the electrical resistor ink can be used to produce radiant heating panels for use in building construction in which the ink is applied to an inner sheet of panel prior to final lamination; coating an insulating fiber; as an anti-static spray to protect surfaces from static charge accumulation or as window defrosters in which the electrical resistor ink is applied in the form of a fine line to a window surface and after drying will act as a heating element.

It is therefore an object of this invention to provide a metallized conductive pigment which possesses desirable electrical and physical properties.

A further object of this invention is to provide novel compositions of matter comprising metallized conductive pigments in which an electrically insulating substrate is coated with two dissimilar metals, the combination of the metals providing the aforesaid desirable electrical and physical properties.

In one aspect an embodiment of this invention resides in an electrically conductive composition of matter comprising an electrically insulating substrate having a base metal deposited thereon, the surface of said base metal being coated with a layer of a noble metal.

A specific embodiment of this invention is found in an electrically conductive composition of matter comprising alpha-alumina having copper deposited thereon, the surface of said copper being coated with a layer of gold.

Other objects and embodiments will be found in the following further detailed description of the present invention.

As hereinbefore set forth the present invention relates to metallized conductive pigments which may be used as fillers in polymeric materials or in electrical resistor inks which may be prepared by depositing a base metal on an electrically insulating substrate and thereafter coating said base metal with a noble metal. The resulting compositions of matter will, as hereinbefore set forth, possess both electrical and physical properties which are desirable, thus avoiding undesirable or adverse reactions effecting these compositions of matter. For example, by utilizing a coating of a noble metal over the base metal, it is possible to avoid the oxidative deterioration to which a base metal may be subjected with a subsequent deterioration of the electrical characteristics of the metallized pigment. In addition to avoiding the unwanted oxidation of the base metal it is also possible, by utilizing the metallized conductive pigments of a type hereinafter set forth in greater detail, to reduce the total metal requirement of the pigment with little or no penalty in the conductance of the finished product. In addition by varying the depth of the coating of the base metal, it is possible to tailor the desired conductance and therefore the finished material containing these metallized pigments may be used as resistive elements where a high conductance is required. The metal coating of the electrically insulating substrate is a function of the film thickness of the particular metal which is utilized and required to give the proper electrical properties. Another function is the surface area of the substrate which is to be covered and the uniformity with which the surface is metallized. Thus, by varying the depth or thickness of the base metal on the substrate, it is possible to obtain a high resistance when the metal film is thin and a low resistance when the coating of the metal is relatively thick. Therefore, in the preferred embodiment of the invention the thickness of the base metal which is deposited on the electrically insulating substrate will vary from a thickness of from about 10 atoms to a thickness of about $10^5$ atoms.

Suitable electrically insulating substrates which may be utilized in the present invention will include refractory oxides such as alumina in either the alpha or gamma form, silica-alumina, silica, zirconia, magnesia, silica-alumina-magnesia, silica-alumina-zirconia, naturally occurring and synthetic zeolites such as the mordenites, faujasites, etc. The particular form in which the refractory oxides are used will vary according to the ultimate use of the finished composition of matter. For example, in some instances it may be desirable that relatively high surface area substrates such as those which possess a surface area greater than about 10 square meters per gram and up to about 500 square meters per gram. Examples of these high surface area substrates will include alumina in the gamma form, silica-alumina, etc. The silica which may be used may be in the form of a silica powder or as quartz. It is also contemplated within the scope of this invention that natural fibrous materials such as cotton, wool or synthetic fibers of the Nylon, Rayon, Dacron, etc. type may be used as substrates, these substrates having advantages over particulate material such as powders or larger size particles in some applications such as in flexible products including paper or cloth which is used in resin filters, etc. When utilizing the metallized pigments of the present invention as fillers for polymeric materials it may be desirable to use the substrates in the form of powders of relatively small size, i.e., particles having a radius size of less than 10 microns and preferably a size of about 1 micron.

Examples of base metals which may be deposited on the electrically insulating substrate of the type hereinbefore set forth will include conductive metals such as copper, nickel, tin, aluminum, etc. Examples of noble metals which are used to coat the base metal and thus provide an oxidative deterrent to the composition of matter will include gold, silver, platinum, palladium, etc.

The preparation of the metallized pigments of the present invention may be accomplished by plating the electrically insulating substrates either by vapor depositing the metals on the substrate or by coating the desired substrate by an electroless deposition technique. As an illustrative example of preparing the desired metallized pigment a substrate such as gamma-alumina, quartz, etc. may be first prepared by milling said substrate to a desired size by any means known in the art such as milling in a ball mill in a liquid medium, said liquid medium usually comprising an organic solvent such as acetone, benzene, toluene, etc. After the substrate has been reduced to the desired size, which in the case of a powder may be less than 10 microns and preferably about 1 micron in radius, the substrate is treated with an activating bath which will make the surface of the substrate receptive to the catalyst bath. For example, the substrate may be immersed in a sensitizing bath comprising a tin solution, a representative example of this being a solution of stannous chloride and stannic chloride in hydrochloric acid. The powder after being subjected to the sensitizing bath is recovered and washed to remove all traces of the sensitizing solution. Thereafter the substrate is then treated with a catalyst activating bath, a representative of this type of bath being a palladium chloride solution in hydrochloric acid. Following treatment with the activating bath, the substrate is then again washed to remove all traces of the activating bath and coated with the desired base metal such as copper by placing the substrate in an appropriate electroless bath, the main ingredient in the case of copper being copper sulfate. In addition the electroless bath will also contain other ingredients including a reductant, the substrate being subjected to a constant stirring in order to insure a uniform exposure of all of the particles to the plating solution. The electrically insulating substrate which has deposited thereon a base metal of desired thickness is thereafter treated with an electroless bath or an immersion containing a noble metal such as gold, silver or palladium, the base metal coated substrate being thoroughly agitated while maintaining the bath at the proper temperature for a period of time sufficient to allow the reaction to go to completion. Thereafter the desired composition of matter comprising the electrically insulating substrate having a base metal deposited thereon, the surface of said base metal being coated with a noble metal, is removed from the solution, washed and treated with hydrogen to produce the desired product.

While the aforementioned discussion of the preparation of the desired composition of matter of the present invention is concerned with an electroless deposition technique it is also contemplated within the scope of this invention that the desired product may be prepared by depositing the metals on the substrate from a vaporous form. When such a process is used, the substrate of the type hereinbefore set forth is placed in an evacuated chamber, said chamber being heated to a temperature sufficient to raise the vapor pressure of the metal to a point which will permit the substrate to be thoroughly coated. An example of this would be a roller drum which may be heated to a temperature of about 190° to 195° C. A metal compound such as copper acetylacetonate is heated to a temperature of about 200° C. and charged to the drum in a vapor phase. The base metal will then coat the substrate in a desired manner. Other metal compounds which may be used to coat the desired substrate will include nickel carbonyl, ferric carbonyl, ferric acetylacetonate, etc. Thereafter the coating of the base metal with a noble metal compound such as alkaline gold cyanine, acid gold, silver cyanine, etc. will be effected in either an electrolytic or electroless manner, these procedures being well known in the plating art.

The following examples are given to illustrate the novel compositions of matter of the present invention and to a method for the preparation of the same. However, these examples are given merely for purposes of illustration and are not intended to limit the generally broad scope of the present invention in strict accordance therewith.

EXAMPLE I

An electrically insulating substrate was prepared by milling 90 micron quartz frits in a ball mill using acetone as the liquid carrier therefrom. The quartz frits were milled until an average particle radius of 0.5 microns was reached. After drying the substrate, said substrate was treated with a sensitizing bath which was prepared by adding 30 grams of stannous chloride to a solution containing 38 grams of concentrated hydrochloric acid and 30 grams of an aged 0.25 mole stannic chloride solution in a total volume of 1 liter. After sensitizing the substrate for a period of 15 minutes, said substrate was removed and washed 2 times with water to remove all traces of the tin-containing solution. The sensitized substrate was then immersed in an activating bath comprising 1 liter of water containing 0.25 grams of palladium chloride, 2.50 cc of concentrated hydrochloric acid and 1 gram of a wetting agent known in the trade as Triton X-100. The substrate was activated for a period of 15 minutes, following which it was removed from the activating solution, washed 2 times with water and placed in an electroless metal plating bath. The metal plating bath which was used in this example comprised 1 liter of water containing 10 grams of copper sulfate, 40 grams of sodium hydroxide, 28 grams of potassium sodium tartrate and 60 cc of a 37% formaldehyde solution. The solution was rapidly stirred for a period of 16 hours and thereafter the product removed. After washing the product which comprised a copper coated quartz having a metal loading of 42.85% copper, the product was placed in a gold immersion bath. This bath comprised 0.1 liter of a solution containing 1.8 grams of acid gold chloride, 40 grams of sodium carbonate in 100 cc of water. Prior to placing the copper coated quartz in the bath, the bath was heated to boiling for 1½ hours. The copper coated quartz powder was added and the reaction was allowed to proceed for a period of 16 hours, following which the composition of matter comprising copper deposited on quartz, the surface of said copper being coated with 3.84% by weight of gold, was removed, washed and treated with hydrogen.

The composition of matter was subjected to a resistivity test and found to possess a resistivity of 1.90 ohm-centimeters at room temperature. In addition, the material was subjected to a test for chemical resistance by immersing said composition of matter in concentrated nitric acid, no visible reaction being observed upon immersion. In contrast to this, a sample of a compound which consisted of the quartz having only copper deposited thereon was also exposed to nitric acid, the immersion in nitric acid resulting in an immediate decomposition of the product with only the inert silica nucleus remaining as a white precipitate. Thus, it was shown that the noble metal coating of the conductive metal protected the more reactive copper, thus permitting the composition of matter to be used in applications which demand the chemical inertness of the copper metal while utilizing the conductivity of the base metal to meet conductivity requirements, the combination of the two resulting in a much lower total metal and noble metal loading.

EXAMPLE II

In this example an electrically insulating substrate is prepared by milling alpha-alumina particles in a ball mill using an acetone carrier until an average particle radius of 1 micron is reached. The particles are then dried and placed in a sensitizing bath similar in nature to that hereinbefore set forth in Example I above. After sensitizing the alpha-alumina for a period of 30 minutes, the substrate is removed, thoroughly washed with water and is then placed in an activating bath comprising a palladium chloride solution. The substrate is activated for a period of 30 minutes, following which it is grain removed, washed and placed in a copper deposition bath. This bath which comprises a mixture of copper sulfate, sodium hydroxide, potassium sodium tartrate and formaldehyde is used to deposit the copper on the alpha-alumina until the desired thickness comprising, in this case, 100 atoms is reached. When the desired thickness is reached, the copper coated alpha-alumina is removed, washed and placed in a silver deposition bath. This silver deposition bath is prepared by admixing silver nitrate, potassium hydroxide, dextrose and nitric acid in an ethanol medium. The bath is prepared by adding ammonium hydroxide to the silver nitrate until the precipitate disappears, thereafter adding potassium hydroxide followed by an additional amount of ammonium hydroxide. The copper coated alpha-alumina is then added to the solution with continuous and rapid agitation to maintain the compound in suspension. Thereafter the solution of dextrose in ethanol and nitric acid is added with continuous agitation until the reaction is completed. The novel composition of matter comprising copper deposited on alpha-alumina, the surface of said copper containing a coating of silver is then removed, washed, and subjected to hydrogen treatment. It will be found that the composition of matter will have an electrical resistivity of about 2 ohm-centimeters and in addition will be resistant to the action of atmospheric oxygen. The latter's resistivity to chemical change is in contrast to a composition of matter comprising alpha-alumina, having deposited thereon only copper, the latter composition of matter reacting with oxygen to leave a non-conductive copper oxide surface on the alpha-alumina substrate.

EXAMPLE III

A substrate comprising silica-alumina is milled in a ball mill in a manner similar to that hereinbefore set forth until an average particle radius of 1 micron is reached. Thereafter the silica-alumina is placed in a sensitizing bath similar in nature to that hereinbefore set forth and after being sensitized is then placed in an activating bath also similar in nature to that hereinbefore set forth. After removal from the activating bath followed by thorough washing, the silica-alumina substrate is then placed in a copper electroless deposition bath with continuous stirring to insure a uniform exposure of all of the particles to the plating solution with a concurrent uniform deposition of copper on the silica-alumina. When the predetermined thickness of copper deposition on the silica-alumina is reached, the product is removed from this bath, washed, and placed in a palladium electroless deposition bath. The palladium electroless deposition bath comprises a mixture of palladium chloride, ethylene diamine tetraacetic acid, ammonium hydroxide and hydrazine hydrate, the deposition of the palladium being accompanied by continuous stirring in order to maintain the particles in suspension. Upon completion of the reaction, the particles are removed, washed, and treated with hydrogen. The electrical resistivity of the novel composition of matter comprising silica-alumina having copper deposited thereon, the surface of said copper being coated with palladium, will be about 2 ohm-centimeters. In addition the composition of matter will exhibit chemical resistance and stability for a long period when immersed in concentrated nitric acid.

EXAMPLE IV

To illustrate the use of fibrous materials, a cotton fiber is treated by placing said fibers in a sensitizing bath comprising a tin chloride solution. After sensitization for a period of 15 minutes, the fibers are removed, washed, and placed in an activating bath comprising a palladium chloride solution. The fibers are activated for a period of 15 minutes following which they are removed, washed and placed in a nickel electroless deposition bath. This nickel bath is similar in nature to the copper deposition bath which has previously been set forth in the above examples. After the fibers have been treated in the bath for a period of 30 minutes while maintaining constant agitation, the nickel coated fibers are removed, washed and placed in a gold chemical deposition bath. The gold chemical deposition bath is prepared by dissolving gold chloride in water, stirring and thereafter placing the nickel coated cotton fibers therein. Following this, the solution is heated to a temperature of 90° C. and a solution of acetic acid in ammonium hydroxide is added until the reaction begins. If so desired hydrazine hydrate may also be added to assist in initiating the reaction. Upon completion of the reaction, the desired composition of matter comprising cotton fiber having nickel deposited thereon, the surface of said nickel being coated with gold, is removed, washed, reduced with hydrogen and recovered. As in the above examples, this composition of matter will possess a resistivity of about 2 ohm-centimeters and will also possess a chemical resistivity toward nitric acid.

We claim as our invention:

1. A metallized conductive pigment comprising a particulate refractory oxide substrate having a surface area greater than 10 square meters per gram and up to about 500 square meters per gram and a particle radius size of less than 10 microns, said substrate having a base metal selected from the group consisting of copper, nickel, tin and aluminum deposited thereon, the surface of said base metal being coated with a noble metal.

2. The composition of matter as set forth in claim 1 in which said substrate is alpha-alumina.

3. The composition of matter as set forth in claim 1 in which said substrate is gamma-alumina.

4. The composition of matter as set forth in claim 1 in which said substrate is silica-alumina.

5. The composition of matter as set forth in claim 1 in which said base metal is copper.

6. The composition of matter as set forth in claim 1 in which said base metal is nickel.

7. The composition of matter as set forth in claim 1 in which said noble metal is gold.

8. The composition of matter as set forth in claim 1 in which said noble metal is silver.

* * * * *